(No Model.)

C. H. GAFFNEY.
BALL CASTER.

No. 545,068. Patented Aug. 27, 1895.

Witnesses:
Lauritz N. Möller
Henry R. Page

Inventor.
Charles H. Gaffney
by Alban Andrén
his atty.

UNITED STATES PATENT OFFICE.

CHARLES H. GAFFNEY, OF GLOUCESTER, MASSACHUSETTS, ASSIGNOR, BY DIRECT AND MESNE ASSIGNMENTS, TO THE CRESCENT AUTOMATIC CASTER COMPANY, OF MAINE.

BALL-CASTER.

SPECIFICATION forming part of Letters Patent No. 545,068, dated August 27, 1895.

Application filed March 18, 1895. Serial No. 542,159. (No model.)

*To all whom it may concern:*

Be it known that I, CHARLES H. GAFFNEY, a citizen of the United States, and a resident of Gloucester, in the county of Essex and State of Massachusetts, have invented new and useful Improvements in Casters, of which the following, taken in connection with the accompanying drawings, is a specification.

This invention relates to improvements in ball-bearings for casters, particularly designed for use on furniture-casters, although it may be equally useful as an antifriction device for other purposes, if so desired.

The invention is carried out as follows, reference being had to the accompanying drawings, wherein—

Figure 1:
Figure 3:
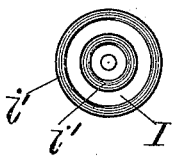
Figure 4:
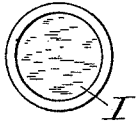
Figure 2:
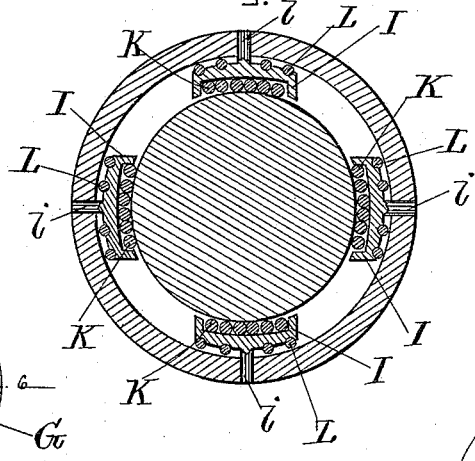
Figure 5:
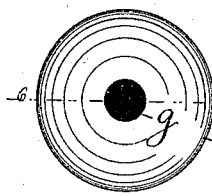
Figure 6:
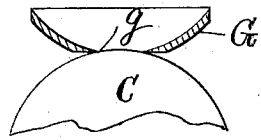

Figure 1 represents a central longitudinal section of the invention, showing the caster-ball in elevation. Fig. 2 represents a cross-section on the line 2 2, shown in Fig. 1. Fig. 3 represents an outside view of one of the rotary ball-holding pockets. Fig. 4 represents an interior view of one of said pockets. Fig. 5 represents a top plan view of the upper ball-holding cup; and Fig. 6 represents a cross-section on the line 6 6, shown in Fig. 5.

Similar letters refer to similar parts wherever they occur on the different parts of the drawings.

The invention is applicable for furniture, desks, pianos, or for other objects where an antifriction-roller bearing is required, and it is carried out as follows.

In the drawings, A represents the caster-spindle, made of metal, smooth or screw-threaded for the purpose of attaching or securing it to the furniture as may be desired.

In one piece with said spindle or secured to it in any suitable manner is made a circular or nearly semispherical socket B, within which is contained the caster-ball C, as shown in Figs. 1 and 2.

D is an annular ring or collar inserted within the lower portion of the socket B, which serves to retain the caster-ball C within the said socket after it has been placed therein, as fully shown in Fig. 1.

Within the upper part of the socket B is a cylindrical recess E, terminating in its upper end as a downwardly-projecting convexo-spherical ball-bearing support F, the lower end of which is preferably slightly flattened, as shown in Fig. 1, and below said support is located a ball-holding cup G, which has a central perforation $g$, through which extends the upper curved surface of the ball C, as shown in Figs. 1, 5, and 6.

Within the cup G are located a series of antifriction-balls H H, the central ones of which serve as an antifriction ball-bearing support in a vertical direction for the caster-ball C.

Within the lower portion of the socket B are located a series of ball-containing pockets I, each one having a pin $i$ journaled in a perforation in the wall of said socket B, as fully shown in Figs. 1 and 2. Each pocket I contains a series of antifriction-balls K, serving as antifriction side bearings for the caster-ball C, as shown in Figs. 1 and 2.

Between the outside of each pocket I and interior of the socket B are located antifriction-balls L L, which are contained in annular grooves $i'$ $i'$ on the rear or outside of said pockets I, as fully shown in Figs. 1, 2, and 3. By this arrangement I produce a most perfect antifriction ball-bearing device for caster-balls having both vertical and lateral antifriction ball-supporting devices.

The upper balls H, during the rotation of the caster-ball C, are caused to automatically change their relative positions within the cup G, so that one or more of the central ones therein always serve as antifriction ball-bearings for the caster-ball against a vertical pressure.

The antifriction-balls K, during the rotation of the caster-ball, are caused likewise to automatically change their relative positions within the rotary pockets I, so that one or more of the central balls in the latter always serve as antifriction ball-bearings for the caster-ball principally against a lateral pressure, but on account of the inclination of said pockets also to a certain extent against a vertical pressure. During the rotation of the caster-ball the pockets I, on account of their being antifrictionally supported on the balls L, will automatically adjust themselves relative to the rotary motion of the caster-ball.

Having thus fully described the nature, construction, and operation of my invention, I wish to secure by Letters Patent and claim—

The herein described ball bearing caster consisting of a socket B having a vertical bearing surface F and a series of balls contained in a perforated cup arranged above the caster ball C and having a series of antifrictionally journaled pockets I pivoted to the socket B and containing a series of antifriction balls K adapted to bear against the caster ball substantially as and for the purpose set forth.

In testimony whereof I have signed my name to this specification, in the presence of two subscribing witnesses, on this 5th day of March, A. D. 1895.

CHARLES H. GAFFNEY.

Witnesses:
 ALBAN ANDRÉN,
 LAURITZ N. MÖLLER.